Patented May 17, 1949

2,470,322

UNITED STATES PATENT OFFICE 2,470,322

THERMOSETTING PHENOLIC MOLDING COMPOSITIONS

Fritz Rosenthal, Gloucester City, N. J., assignor to The University of Tennessee Research Corporation, Knoxville, Tenn., a corporation of Tennessee No Drawing. Application August 13, 1945, Serial No. 610,669

4 Claims. (Cl. 260—7)

This invention relates to molding compositions and more particularly to a composition including a synthetic resin, a filler and a flow modifier which assume a hard infusible form when subjected to heat and pressure.

This invention resides in the use in a moldable composition of cooked cottonseed meal which partially replaces the synthetic resin and a filler, which greatly improves the flow of the composition, which has no appreciable influence on the impact strength, which only slightly reduces its water resistance quality and which reduces the cost of the composition as compared with other flow modifiers such as uncooked soybean meal and the like.

Flow modifiers are used in plastic molding compositions to impart specific flow properties to the compound in any particular use. It is well known that proteins meet these requirements; and animal and vegetable proteins which are abundant and inexpensive are used for this purpose. There are two types of vegetable proteins available in large quantities, soybean meal and cottonseed meal. Soybean meal has been extensively studied and commercially utilized in connection with phenolic plastics. In contrast I understand that cottonseed meal as a flow modifier for phenolic plastics has not been used, because cottonseed protein is subjected to cooking incidental to the extraction of cottonseed oil, and the general assumption has been that this cooking process severely damages the meal. Soybean meal, on the other hand, contains protein in an uncooked condition.

As reported in Industrial & Engineering Chemistry, vol. 34, pages 1154–1157, I have discovered that the cooked cottonseed meal can be compounded with phenolic resins and lends better flow properties to the material than uncooked soybean meal. A comparison of experimental data reveals that the water resistance of molded plastics containing cooked cottonseed meal is much greater than that containing uncooked soybean meal. Soybean meal contains 10 to 20% of water-soluble matter, notably sugars, which are mainly responsible for the poor water resistance of soybean plastics. This water resistance is improved by extraction of these water-solubles preliminary to the use of soybean meal in plastics; but even after those water-solubles have been removed from soybean meal, the water resistance of soybean plastics is still inferior to a compound containing an equivalent amount of cottonseed meal. The absence of water-solubles in cottonseed meal obviates this preliminary processing step which is a decided advantage of cottonseed meal over soybean meal.

Cooked cottonseed meal, as available in the cotton oil mill, contains five to six per cent of cotton oil which content is too high for use in molding compositions but can be easily reduced to one per cent or less by solvent-extraction as known to the art. The meal often contains coarse hull particles, not passing a U. S. Bureau of Standards 40-mesh screen; and since the coarse particles have a tendency to depress the mechanical strength characteristics of molded plastics it is desirable to remove them by screening.

To procure a composition of the desired characteristics for a particular use the cooked cottonseed meal thus treated is mixed with the phenolic resin and filler in the proportions required, this mixing being effected by means or procedures well known in the synthetic resin compositions art.

Two compositions using cooked cottonseed meal with phenolic resin and filler will be discussed in detail in the following examples:

Example 1

| | Parts |
|---|---|
| Phenol-formaldehyde resin | 4 |
| Cottonseed hull filler | 3 |
| Cooked, oil-extracted cottonseed meal | 1 | were compounded together in a manner known to the art.

For the sake of comparison, the following compound was prepared in exactly the same manner:

| | Parts |
|---|---|
| Phenol-formaldehyde resin | 4 |
| Cottonseed hull filler | 4 |

The flow in a Bakelite-Olsen flow tester at 700 pounds per square inch and 300° F. was obtained:

1.50 inches for the meal-containing compound
0.25 inch for the meal-free compound The impact strength was:

0.20 ft.-lbs. for the meal-containing compound
0.20 ft.-lbs. for the meal-free compound The water absorption in twenty-four hours was:

0.43 per cent for the meal-containing compound
0.30 per cent for the meal-free compound From Example 1 it appears that the introduction of cooked oil-extracted cottonseed meal in a compound in partial replacement of the filler greatly improves the flow, has no influence on impact strength, and impairs the water resistance only slightly.

| | Parts |
|---|---|
| Phenol-formaldehyde resin | 1 |
| Cottonseed hull filler | 1 |
| Cooked oil-extracted cottonseed meal | 1 | were compounded together in a manner known to the art. The raw material cost of this compound is 20 per cent less than the compound containing equal parts of resin and filler but no meal. The meal-containing material, while cheaper than meal-free phenolic compounds, was found to have the following characteristics obtained in tests comforming with A. S. T. M. specifications:

| | |
|---|---|
| Water absorption in twenty-four hours | 0.8 per cent |
| Flexural strength (molded at 320° F.) | 9800 lbs./in.$^2$ |
| Impact strength Izod (molded at 320° F.) | 0.26 ft.-lbs. |
| Cure time (molded at 320° F.) | 60 seconds |
| Flow (at 320° F. and 2000 lbs./in.$^2$) | 0.66 inch |

In order to compare the flow-modifying effect of cooked cottonseed meal on the compound the meal was replaced by hulls, resulting in a compound containing:

| | Parts |
|---|---|
| Phenol-formaldehyde resin | 1 |
| Cottonseed hull filler | 2 |

Flow of this meal-free compound at 320° F. and 2000 lbs./in.$^2$:0.07 inch. This compares with 0.66 inch flow for the meal-containing material under the same pressing conditions, a nine to one differential in favor of the flow-modifying effect of cooked cottonseed meal.

The examples given above are typical for two applications of cooked cottonseed meal: (1) producing a compound of extreme flow regardless of cost, (2) producing a compound of acceptable quality at reduced cost.

The cooked cottonseed meal can also be used with other phenolic-aldehyde resins and prominent among such examples are plastic compounds of the meal with cresol-formaldehyde, xylenol-formaldehyde and resorcinol-formaldehyde.

In many instances special properties are required in a molding composition which requires a modified ratio of phenolic resin, filler, and cooked cottonseed meal; and the invention is therefore not limited to specific proportions of these ingredients in a compound or composition but involves the use in any appropriate proportion of cooked cottonseed meal as a flow modifier in phenolic molding compositions.

The "filler" that I have employed is cottonseed hulls but the functional equivalents of wood flour, cotton flock, asbestos and cottonseed bran and fiber are to be understood as covered by the term "filler" as used in the claims.

The application for this patent is a continuation-in-part of my former application filed March 20, 1943, Serial No. 479,941 and now abandoned.

What I claim is:

1. A thermosetting molding composition comprising equal parts of a phenol-formaldehyde resin, a filler of cottonseed hulls and a flow modifier of cooked substantially oil-free cottonseed meal.

2. A thermosetting molding composition comprising equal parts of a phenol-formaldehyde resin, a filler of cottonseed hulls and a flow modifier of cooked substantially oil-free cottonseed meal all particles of which will pass through a U. S. Bureau of Standards 40-mesh screen.

3. A thermosetting molding composition comprising approximately four parts of phenol-formaldehyde resin, from three to four parts of cottonseed hulls and a flow modifier of from one to four parts of cooked oil-extracted cottonseed meal.

4. A thermosetting molding composition comprising approximately four parts of phenol-formaldehyde resin, three parts of cottonseed hulls and one part of cooked substantially oil-free cottonseed meal.

FRITZ ROSENTHAL.

REFERENCES CITED

The following references are of record in the file of this patent:

UNITED STATES PATENTS

| Number | Name | Date |
|---|---|---|
| 2,006,736 | Fuhrmann | July 2, 1935 |
| 2,332,801 | Leonardson | Oct. 26, 1943 |
| 2,373,401 | King | Apr. 10, 1945 |

OTHER REFERENCES

Rosenthal, Ind. and Eng. Chem., vol. 34, pp. 1154–1157, Oct. 1942.